United States Patent
Nakamura

[11] 3,784,284
[45] Jan. 8, 1974

[54] ZOOM LENS SYSTEM FOR CLOSE UP PHOTOGRAPHY

[75] Inventor: Soichi Nakamura, Kamakura, Japan

[73] Assignee: Nippon Kogaku K.K., Tokyo, Japan

[22] Filed: July 22, 1971

[21] Appl. No.: 165,169

[30] Foreign Application Priority Data
July 25, 1970 Japan.............................. 45/64707

[52] U.S. Cl.................................. 350/186, 350/214
[51] Int. Cl. ............................................ G02b 15/18
[58] Field of Search............................ 350/184, 186

[56] References Cited
UNITED STATES PATENTS

| | | | |
|---|---|---|---|
| 3,507,555 | 4/1970 | Isshiki | 350/184 |
| 2,847,907 | 8/1958 | Angenieux | 350/184 |
| 3,584,935 | 6/1971 | Kojima | 350/184 |
| 3,391,973 | 7/1968 | Laurent | 350/186 X |
| 3,659,921 | 5/1972 | Hirose | 350/186 |
| 3,661,445 | 5/1972 | Someya | 350/186 |

Primary Examiner—John K. Corbin
Attorney—Fitzpatrick, Cella, Harper & Scinto

[57] ABSTRACT

A zoom lens comprising a magnification varying system consisting of three lens groups of converging, diverging and converging types, respectively, at least one of the three lens groups being a focusing lens group, a relay lens disposed rearwardly of the magnification varying system and consisting of two lens groups. A stop and a beam splitter are both disposed between the two lens groups forming the relay lens, the third of the three lens groups in the magnification varying system being adapted to be individually advanced by a predetermined amount for its respective magnification varying positions, whereby an ultra-short shot can be accomplished.

1 Claim, 30 Drawing Figures

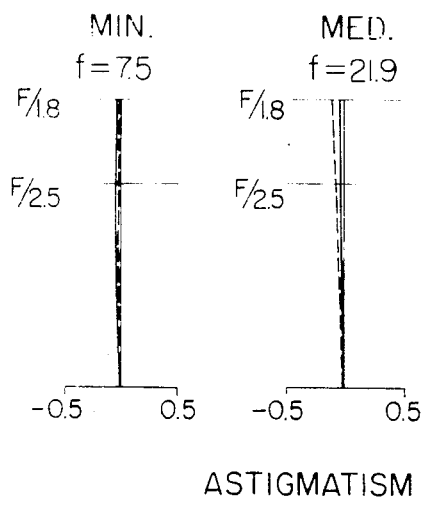
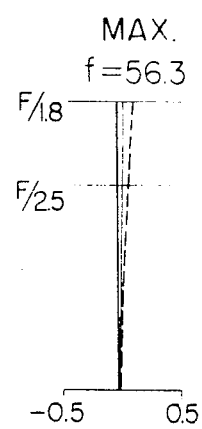
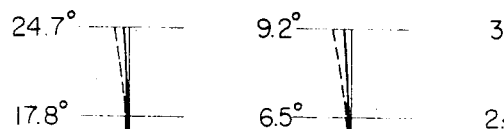
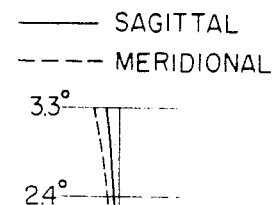
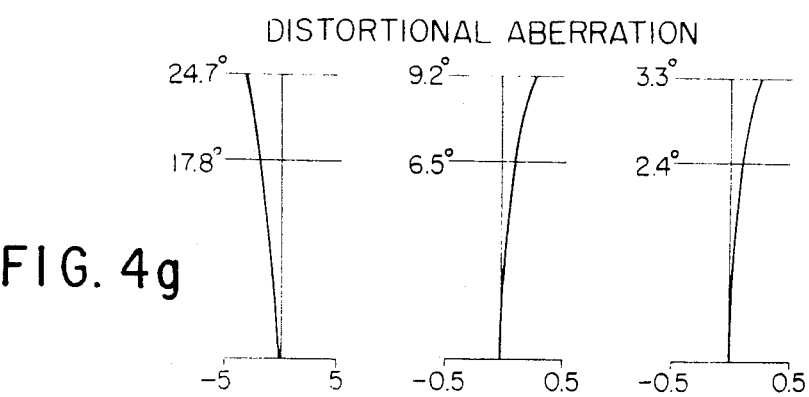

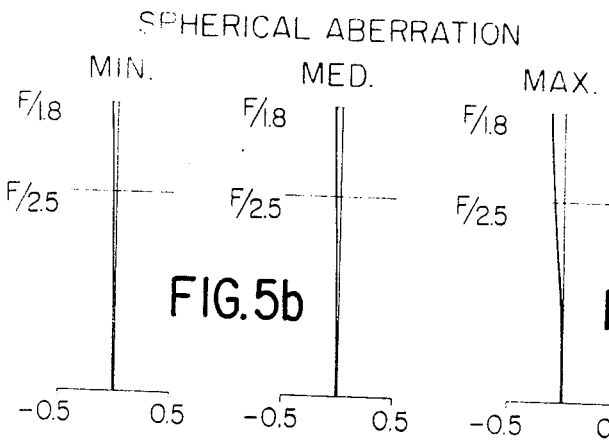
FIG. 5a   FIG. 5b   FIG. 5c
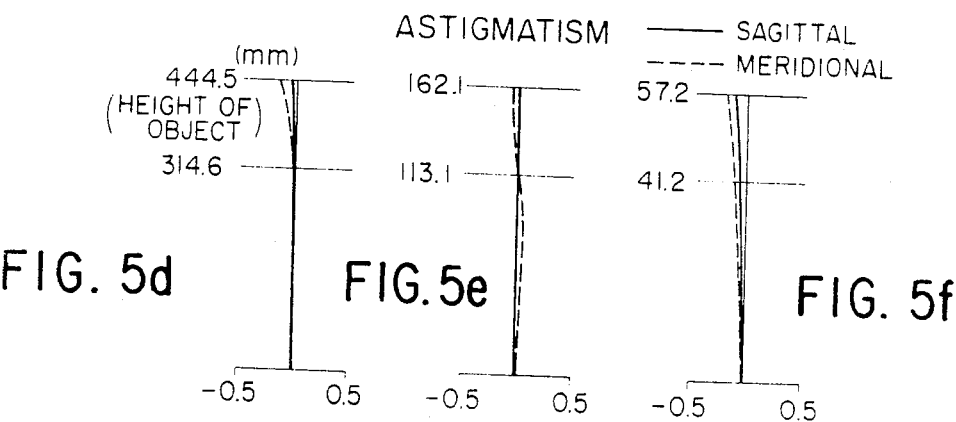
FIG. 5d   FIG. 5e   FIG. 5f
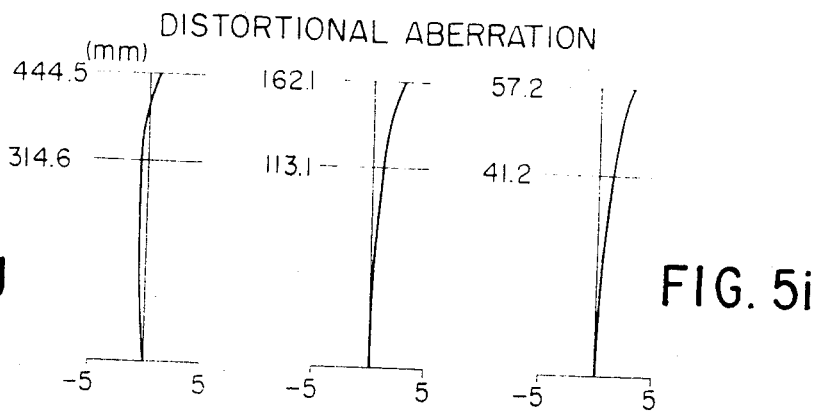
FIG. 5g   FIG. 5i
FIG. 5h

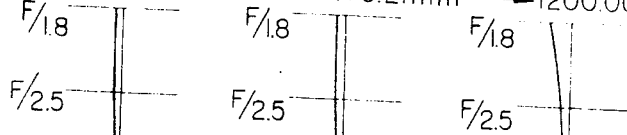
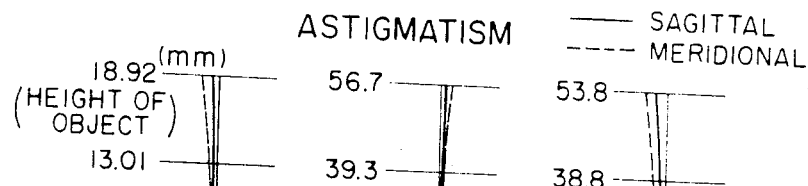
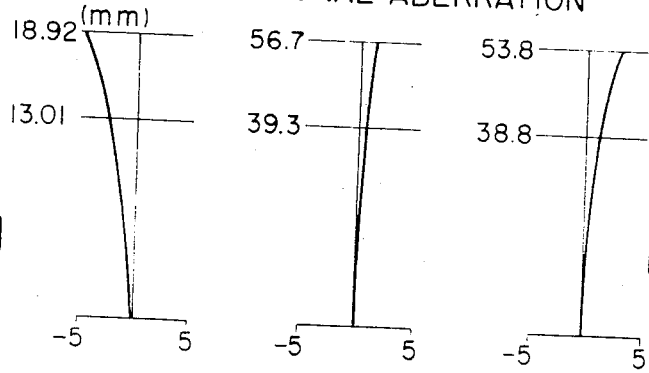

ial system according to an embodiment of the present invention;
ZOOM LENS SYSTEM FOR CLOSE UP PHOTOGRAPHY

BACKGROUND OF THE INVENTION

1. Field of the Invention

This invention relates to optical systems, and more particularly to such systems involving a zoom lens which is capable of ultra-short range close-up photography.

2. Description of the Prior Art

In conventional zoom lens systems, focusing has been accomplished by advancing the foremost or first lens group, in order to prevent the focal plane from being displaced with variations in the photographing distance. The foremost, or first lens group, often takes the form of converging lens for the stabilization of aberrations. In such a focusing method, using the step of advancing the foremost lens group of the converging type, as the amount of advancement of such lens group is increased to reduce the photographing distance, oblique incident rays tend to pass through the outer regions, rather than the inner regions, of the lens group due to the relationship between the angle of field and the amount of advancement of the lens group. For this reason, the foremost lens group must have an increased diameter. However, the diameter of the foremost lens group is determined by considering the balance between the performance and the dimensions of the lens system, and this has limited the available photographing distance. Therefore, in a zoom lens of great zoom ratio such as that used with a cinecamera, the distance for close-up has become as great as 100 to 200 times the minimum focal length and it has thus been impossible to achieve the same close-up shots as those achieved by a lens of fixed, short focal length.

Attempts have been made to greatly reduce the photographing distance by designing a zoom lens system so that the whole or part of a relay lens disposed behind a magnification varying system is movable along the optic axis of the zoom lens independently of the zooming action or advancement of the foremost lens. However, such zoom lens systems have the disadvantages as will be described hereunder.

First, in a zoom lens of the type in which the relay lens system consists of two lens groups disposed, respectively, before and behind a stop, and the rearward of the two groups is movable along the optic axis, the principal ray of light passes through the outer region of the foremost lens group, undesirably causing a greatly varied distortion which is particularly increased in the negative sense on the side of the short focal length. Also, when such type of zoom lens is used with cinecameras except those which use a mirror shutter, the object to be photographed cannot be viewed through the viewfinder even by moving the rearward lens group for short-distance focusing, because in almost all of these cinecameras a beam splitter mirror for directing light to the viewfinder is disposed forwardly of the stop.

Second, in a zoom lens of the type in which the forward lens group of the relay lens system is movable along the optic axis, the peripheral ray of light passes through the center of the lens so that the variation in aberration is less than in the former type; however, in fact, it is physically difficult to move the forward lens group because the beam splitter or the stop is located rearwardly thereof in closely adjacent relationship. In order to allow the axial movement of the forward lens group, it is necessary to predetermine the spacing between such lens group and the beam splitter or the stop. This would lead to a result that the principal ray which should pass through the center of the stop is compelled to pass through an outer region of the lens forming the magnification varying system; and to compensate for this, the first lens group must be of very great diameter. Accordingly, the diameter of the magnification varying system must be also increased. Thus, the dimensions of the entire zoom lens system will be greatly increased. Otherwise, the range of the combined focal length must be shifted toward the side of the long focal length to unavoidably reduce the angle of field in front of the stop.

SUMMARY OF THE INVENTION

In view of the situations described above, the present invention intends to provide a zoom lens system which eliminates the foregoing drawbacks and is capable of ultra-short shots.

According to the present invention, there is provided a zoom lens which is capable of ultra-short shots and which comprises a magnification varying system consisting of three lens groups of converging diverging and converging types, respectively, at least one of which is a focusing lens. The zoom lens system further comprises a relay lens consisting of two lens groups disposed rearwardly of the magnification varying system, and a stop and a beam splitter disposed between the two lens groups forming the relay lens. The third of the lens groups forming the magnification varying system is adapted to be individually advanced a predetermined amount from its respective magnification varying positions.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein.

Figure 3:
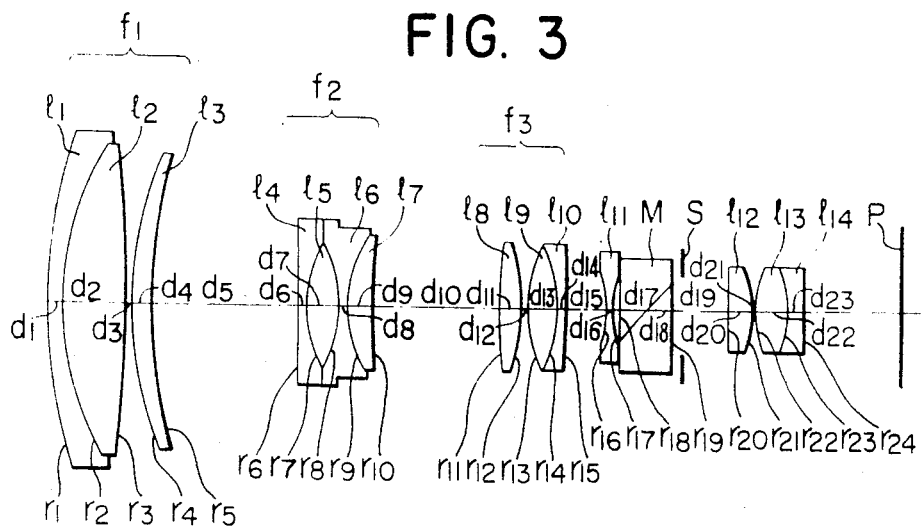
FIG. 3 is a view showing the arrangement of the optical system according to an embodiment of the present invention.

FIGS. 4a to 4i graphically illustrates various aberrations in the optical system of FIG. 3 at minimum, medium and maximum focal lengths for infinite photographing distance;

FIGS. 5a to 5i illustrates various aberrations in the same optical system at minimum, medium and maximum focal lengths for a photographing distance of 1.2 meters; and FIGS. 6a to 6i graphically illustrates various aberrations in the same optical system at minimum, medium and maximum focal lengths for various photographing distances when the third lens group in the magnification varying system has been further advanced from the position represented by FIG. 5.

DESCRIPTION OF THE PREFERRED EMBODIMENTS

Figure 1:
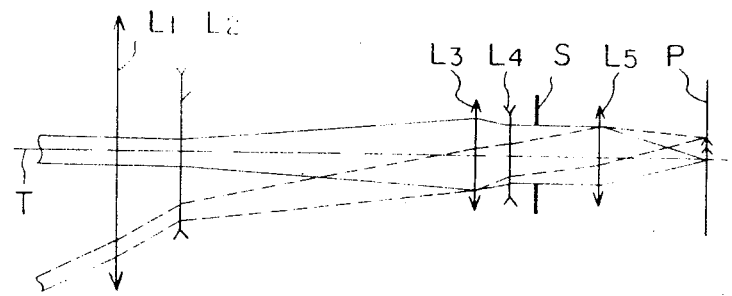
FIGS. 1 and 2 are schematic views illustrating systems embodying the principle of the present invention.
Figure 2:
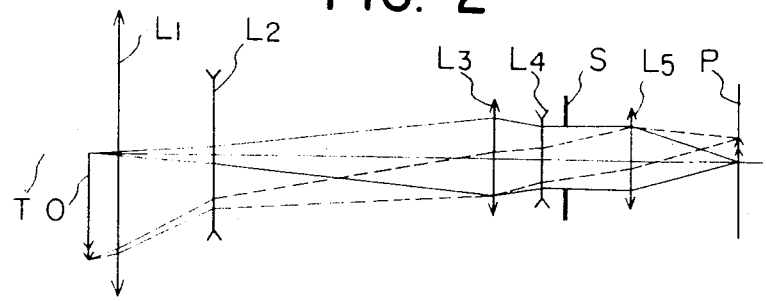

Referring to FIGS. 1 and 2, the principle of the present invention is illustrated schematically. A first lens group L1 of converging type is adapted for forward movement along the optic axis T to focus an object O upon a film surface P. A second lens group L2 of diverging type and a third lens group L3 of converging type are movable along the optic axis T for a zooming action. These three lens groups L1 to L3 together constitute a magnification varying system. A fourth lens group L4 of diverging type and a fifth lens group L5 of converging type form the forward and rearward groups of a relay lens system having a stop S interposed therebetween.

In FIG. 1, an object at infinity is focused upon the film surface or plane P with the minimum focal length. Then, by advancing the first lens group L1, the composite principal face of the entire zoom lens system is moved forwardly or toward the object so that the object is brought to the conventionally so-called "close-up" distance and focused upon the film surface P. Further, by advancing the third lens group L3 individually, the composite principal face is further moved forwardly so that the object O is positioned just in front of the first lens group L1 and focused upon the film surface P, whereby the so-called "ultra-close-up" may be achieved.

An embodiment of the present invention will now be described in detail. Referring to FIG. 3, there is shown an application of the present invention to the zoom lens of a cinecamera. Lenses $l_1$ to $l_3$ constitute the first lens group L1, lenses $l_4$ to $l_7$ the second lens group L2, lenses $l_8$ to $l_{10}$ the third lens group L3, and lenses $l_{11}$ to $l_{14}$ the relay lens system L4- L5. A beam splitter mirror M is disposed for splitting the beam of light extending from the magnification varying system L1-L3 and passing through the forward lens group L4 of the relay lens system into two beams directed to the film and to the viewfinder (not shown). As in FIGS. 1 and 2, the letters S and P denote the stop and the film surface, respectively.

The table below shows the various data for F/1.8 as the focal length of the described lens system is continuously varied from minimum $f = 7.5$ to maximum $f = 56.3$ by zooming.

TABLE

1st Group (L1)
$f1 = 75.2$
  $r1 = 85.943$
  $r2 = 40.600$
  $r3 = -292.56$
  $r4 = 42.962$
  $r5 = 69.590$
2nd Group (L2)
$f2 = -15.75$
  $r6 = 205.15$
  $r7 = 17.2$
  $r8 = -28.4$
  $r9 = 17.558$
  $r10 = 52.125$
3rd Group (L3)
$f3 = 19.31$
  $r11 = 86.894$
  $r12 = -33.490$
  $r13 = 25.000$
  $r14 = -17.2$
  $r15 = -254.65$
Relay Lens (L4, L5)
  $r16 = -24.05$
  $r17 = 24.05$
  $r18 = \infty$
  $r19 = \infty$
  $r20 = 1100.000$
  $r21 = -17.335$
  $r22 = 17.9$
  $r23 = -14.53$
  $r24 = 174.6$ $d1 = 1.4$  $n1 = 1.74077$  $\nu1 = 27.7$
$d2 = 9.5$  $n2 = 1.65160$  $\nu2 = 58.5$
$d3 = 0.1$
$d4 = 3.4$  $n3 = 1.5168$  $\nu3 = 64.2$
$d5 = 1.73 - 22.43 - 33.23$
$d6 = 0.9$  $n4 = 1.717$  $\nu4 = 47.9$
$d7 = 5.0$
$d8 = 0.8$  $n5 = 1.51835$  $\nu5 = 60.3$
$d9 = 3.3$  $n6 = 1.72825$  $\nu6 = 28.3$
$d10 = 45.72 - 20.37 - 2.96$
$d11 = 2.9$  $n7 = 1.6516$  $\nu7 = 58.3$
$d12 = 0.1$
$d13 = 5.5$  $n8 = 1.65830$  $\nu8 = 57.3$
$d14 = 0.9$  $n9 = 1.72342$  $\nu9 = 38.0$
$d15 = 1.47 - 6.12 - 12.73$
$d16 = 0.8$  $n10 = 1.65830$  $\nu10 = 57.3$
$d17 = 0.85$
$d18 = 8.3$  $n11 = 1.57501$  $\nu11 = 41.3$
$d19 = 8.9$
$d20 = 3.9$  $n12 = 1.62374$  $\nu12 = 47.0$
$d21 = 0.2$
$d22 = 5.3$  $n13 = 1.62041$  $\nu13 = 60.3$
$d23 = 1.2$  $n14 = 1.80518$  $\nu14 = 25.5$ In the above table, r represents the radii of curvature of lenses, d the center thicknesses and air gaps of lenses (see also FIG. 3), n the refractive indices of the lens glasses for d-ray, $\nu$ the Abbe numbers of the lens glasses, and suffix numbers represent the order of each lens as viewed from the object.

FIG. 4 illustrates various aberrations at minimum focal length $f = 7.5$, medium focal length $f = 21.9$ and maximum focal length $f = 56.3$, for infinite photographing distance.

In FIG. 3, the photographing distance provided by the advancement of the first lens group L1 (amounting to 5.7 mm) is 1,200 mm (as measured from the object to the film surface), and the aberrations at the minimum, medium and maximum focal lengths in this case are shown in FIG. 5.

In an ultra-short shot effected with the third lens group L3 advanced 2.5 mm in addition to the advancement of the first lens group L1, the photographing distance ranges from 1,200 mm (maximum focal length) to 134.89 mm (minimum focal length), and this latter photographing distance 134.89 mm enables the ultra-short shot of 2.81 mm from the front end of the first lens group L1. Aberrations occurring in this case at the respective photographing distances (for minimum, medium and maximum focal lengths) are shown in FIG. 6.

Although the above-described embodiment is constructed so that ultra-short shots (in this case, the photographing distance is 134.89 mm) may be effected by advancing the third lens group L3, it is, of course, possible to arrange the system so that an ultra-short shot can be achieved at each focal length by further advancing the third lens group a predetermined amount from the respective magnification varying position.

According to the present invention, as has been noted above, when the photographing distance is set to the minimum value (134.89 mm), the third lens group is positioned closer to the stop than to the side of the maximum focal length, so that the principal ray of light passes through the vicinity of the center of the third lens group. This reduces the variation in distortion which forms a problem especially in the minimum focal length. Moreover, the third lens group, which is originally achromatized to a sufficient degree, is free of any variation in chromatic aberration which would otherwise result from the movement thereof. Also, since the third lens group is disposed forwardly of the stop, the object to be photographed at a short distance can be viewed through the viewfinder even in a cinecamera having a beam splitter disposed just in front of the stop. In addition, the movement of the third lens group for ultra-short shots takes place within the space for zooming action and this contributes to the protection of the entire lens system against any adverse effect in performance.

I believe that the construction and operation of my novel lens system will be understood, and that the advantages of my invention will be fully appreciated by those persons skilled in the art.

I claim:

1. A zoom lens system of the class described capable of effecting photography over a substantial photographic distance including an ultra close up range, comprising:
   a magnification varying system including three lens groups of converging, diverging and converging types, respectively, the first lens group of said three lens groups being a focusing lens group, the second and third lens groups of said three lens groups being movable for varying magnification;
   a relay lens disposed rearwardly of said magnification varying system and including two lens groups;
   the third of said three lens groups in said magnification varying system being adapted to be individually shifted a predetermined amount along the optic axis of the system from its respective magnification varying positions, said lens system having substantially the following values;

| | | | | |
|---|---|---|---|---|
| 1st Group (L1) $f_1 = 75.2$ | $r_1 = 85.943$ | $d_1 = 1.4$ | $n_1 = 1.74077$ | $\nu_1 = 27.7$ |
| | $r_2 = 40.600$ | $d_2 = 9.5$ | $n_2 = 1.65160$ | $\nu_2 = 58.5$ |
| | $r_3 = -292.56$ | $d_3 = 0.1$ | | |
| | $r_4 = 42.962$ | $d_4 = 3.4$ | $n_3 = 1.5168$ | $\nu_3 = 64.2$ |
| | $r_5 = 69.590$ | $d_5 = 1.73 - 22.43 - 33.23$ | | |
| | $r_6 = 205.15$ | | | |
| 2nd Group (L2) $f_2 = -15.75$ | $r_7 = 17.2$ | $d_6 = 0.9$ | $n_4 = 1.717$ | $\nu_4 = 47.9$ |
| | $r_8 = -28.4$ | $d_7 = 5.0$ | | |
| | $r_9 = 17.558$ | $d_8 = 0.8$ | $n_5 = 1.51835$ | $\nu_5 = 60.3$ |
| | $r_{10} = 52.125$ | $d_9 = 3.3$ | $n_6 = 1.72825$ | $\nu_6 = 28.3$ |
| | $r_{11} = 86.894$ | $d_{10} = 45.72 - 20.37 - 2.96$ | | |
| | $r_{12} = -33.490$ | $d_{11} = 2.9$ | $n_7 = 1.6516$ | $\nu_7 = 58.3$ |
| 3rd Group (L3) $f_3 = 19.31$ | $r_{13} = 25.000$ | $d_{12} = 0.1$ | | |
| | $r_{14} = -17.2$ | $d_{13} = 5.5$ | $n_8 = 1.65830$ | $\nu_8 = 57.3$ |
| | $r_{15} = -254.65$ | $d_{14} = 0.9$ | $n_9 = 1.72342$ | $\nu_9 = 38.0$ |
| | $r_{16} = -24.05$ | $d_{15} = 1.47 - 6.12 - 12.73$ | | |
| | $r_{17} = 24.05$ | $d_{16} = 0.8$ | $n_{10} = 1.65830$ | $\nu_{10} = 57.3$ |
| | $r_{18} = \infty$ | $d_{17} = 0.85$ | | |
| Relay Lens (L4,L5) | $r_{19} = \infty$ | $d_{18} = 8.3$ | $n_{11} = 1.57501$ | $\nu_{11} = 41.3$ |
| | $r_{20} = 1100.000$ | $d_{19} = 8.9$ | | |
| | $r_{21} = -17.335$ | $d_{20} = 3.9$ | $n_{12} = 1.62374$ | $\nu_{12} = 47.0$ |
| | $r_{22} = 17.9$ | $d_{21} = 0.2$ | | |
| | $r_{23} = -14.53$ | $d_{22} = 5.3$ | $n_{13} = 1.62041$ | $\nu_{13} = 60.3$ |
| | $r_{24} = 174.6$ | $d_{23} = 1.2$ | $n_{14} = 1.80518$ | $\nu_{14} = 25.5$ | wherein, $r$ represents the radii of curvature of lenses, $d$ the center thicknesses and air gaps of lenses $n$ the refractive indices of the lens glasses for d-ray, $\nu$ the Abbe numbers of the lens glasses, and suffix numbers represent the order of each lens as viewed from the object.

* * * * *

UNITED STATES PATENT OFFICE
CERTIFICATE OF CORRECTION

Patent No. 3,784,284        Dated January 8, 1974

Inventor(s) SOICHI NAKAMURA

It is certified that error appears in the above-identified patent and that said Letters Patent are hereby corrected as shown below:

Column 2, line 62, after "5i", insert -- graphically --.

Column 6, line 1, delete "d3 = 0.1";
Column 6, between lines 10 and 15, in the line following "r11 = 86.894", delete "d11 = 2.9"; same line, insert -- d11 = 2.9 -- beneath "d10 - 45.72".

Signed and sealed this 11th day of June 1974.

(SEAL)
Attest:

EDWARD M. FLETCHER, JR.
Attesting Officer

C. MARSHALL DANN
Commissioner of Patents